United States Patent
Kitada et al.

[19]

[11] Patent Number: 6,053,842
[45] Date of Patent: Apr. 25, 2000

[54] DRIVE SYSTEM FOR HYBRID DRIVE VEHICLE

[75] Inventors: Shinichiro Kitada, Tokyo; Shunichi Aoyama; Noboru Hattori, both of Kanagawa; Isaya Matsuo, Tokyo, all of Japan

[73] Assignee: Nissan Motor Co., Ltd., Yokohama, Japan

[21] Appl. No.: 09/268,745

[22] Filed: Mar. 17, 1999

[30] Foreign Application Priority Data

Mar. 31, 1998 [JP] Japan .................................. 10-086647

[51] Int. Cl.$^7$ .................................................. B60K 41/00
[52] U.S. Cl. .................................... 477/5; 477/8; 477/15; 477/906; 180/65.4
[58] Field of Search ........................... 475/2, 5; 477/3–8, 477/15, 906; 180/65.4

[56] References Cited

U.S. PATENT DOCUMENTS

| | | | |
|---|---|---|---|
| 4,233,858 | 11/1980 | Rowlett | 475/72 X |
| 5,568,023 | 10/1996 | Grayer et al. | 180/65.4 X |
| 5,588,498 | 12/1996 | Kitada | 180/65.4 |

FOREIGN PATENT DOCUMENTS

5-50865  3/1993  Japan .

*Primary Examiner*—Khoi Q. Ta
*Attorney, Agent, or Firm*—Foley & Lardner

[57] ABSTRACT

A drive system for a hybrid drive vehicle, comprises a driving mechanism which includes a clutch, an engine connected the clutch, a first motor for generating power, connected to the clutch, a second motor for driving a drive wheel, connected to the clutch, and a transmission connected to the clutch. A third motor is provided for driving a hydraulic pump of a hydraulic system for the transmission. A first inverter is connected between the first motor and a battery, in which charging and discharging between the first motor and the battery being made through the first inverter. A second inverter is connected between the second motor and the battery, in which charging and discharging between the second motor and the battery being made through the second inverter. A third inverter is connected between the third motor and the battery, in which changing and discharging between the battery and the motor being made through the third inverter. A first trouble detecting device is provided for detecting trouble in the first motor and in the first inverter. Additionally, a controller is provided for controlling the engine, the inverters, the transmission and the clutch. The controller is arranged to engage the clutch and to drive the second motor so as to start operation of the engine under firing, in response to the trouble detected by the first trouble detecting device.

10 Claims, 10 Drawing Sheets

DRIVE SYSTEM FOR HYBRID DRIVE VEHICLE

BACKGROUND OF THE INVENTION

This invention relates to improvements in a drive system for a hybrid drive vehicle which uses an engine and an electric motor as driving sources.

Hitherto a variety of hybrid drive vehicles have been proposed in which an engine and an electric motor are used as driving sources for the vehicle. One of them is disclosed in Japanese Patent Provisional Publication No. 5-50865. In such a hybrid drive vehicle, as compared with a conventional vehicle driven only by an engine, the hybrid drive vehicle is additionally provided with a motor, a battery, inverters and the like so that configuration of a drive mechanism and a drive control system is complicated.

SUMMARY OF THE INVENTION

Even with the hybrid drive vehicles having such complicated configuration of the drive mechanism and the drive control system, it has been required to secure a minimum necessary running function when trouble arises in the drive mechanism and the drive control system.

It is an object of the present invention to provide an improved drive system for a hybrid drive vehicle, which can secure a minimum necessary running function of the vehicle even if trouble arises in the drive system.

Another object of the present invention is to provide an improved drive system for a hybrid drive vehicle, by which an engine can be started to make its firing operation even if trouble arises in a power generating motor and an inverter for the motor.

A further object of the present invention is to provide an improved drive system for a hybrid drive vehicle, by which an engine can make its firing operation under driving of a driving motor through a clutch even in case that trouble arises in a power generating motor and an inverter for the motor.

A drive system according to the present invention is for a hybrid drive vehicle and comprises a driving mechanism. The driving mechanism includes a clutch having power input and output shafts, an engine connected to the power input of the clutch, a first motor for generating power, connected to the power input shaft of the clutch, a second motor for driving a drive wheel, having an input shaft connected to the power output shaft of the clutch, and a transmission having a power input shaft connected to the power output shaft of the clutch, and a power output shaft connected to the drive wheel. A third motor is provided for driving a hydraulic pump of a hydraulic system for the transmission. A battery is provided. A first inverter is connected between the first motor and the battery, in which charging and discharging between the first motor and the battery are made through the first inverter. A second inverter is connected between the second motor and the battery, in which charging and discharging between the second motor and the battery are made through the second inverter. A third inverter is connected between the third motor and the battery, in which changing and discharging between the battery and the motor are made through the third inverter. A first trouble detecting device is provided for detecting trouble in the first motor and in the first inverter. Additionally, a controller is provided for controlling the engine, the inverters, the transmission and the clutch. The controller is arranged to engage the clutch and to drive the second motor so as to start operation of the engine under firing, in response to the trouble detected by the first trouble detecting device.

BRIEF DESCRIPTION OF THE DRAWINGS

In the drawings, like reference numerals designate like elements and parts throughout all figures, in which.

DETAILED DESCRIPTION OF THE INVENTION

Figure 1:
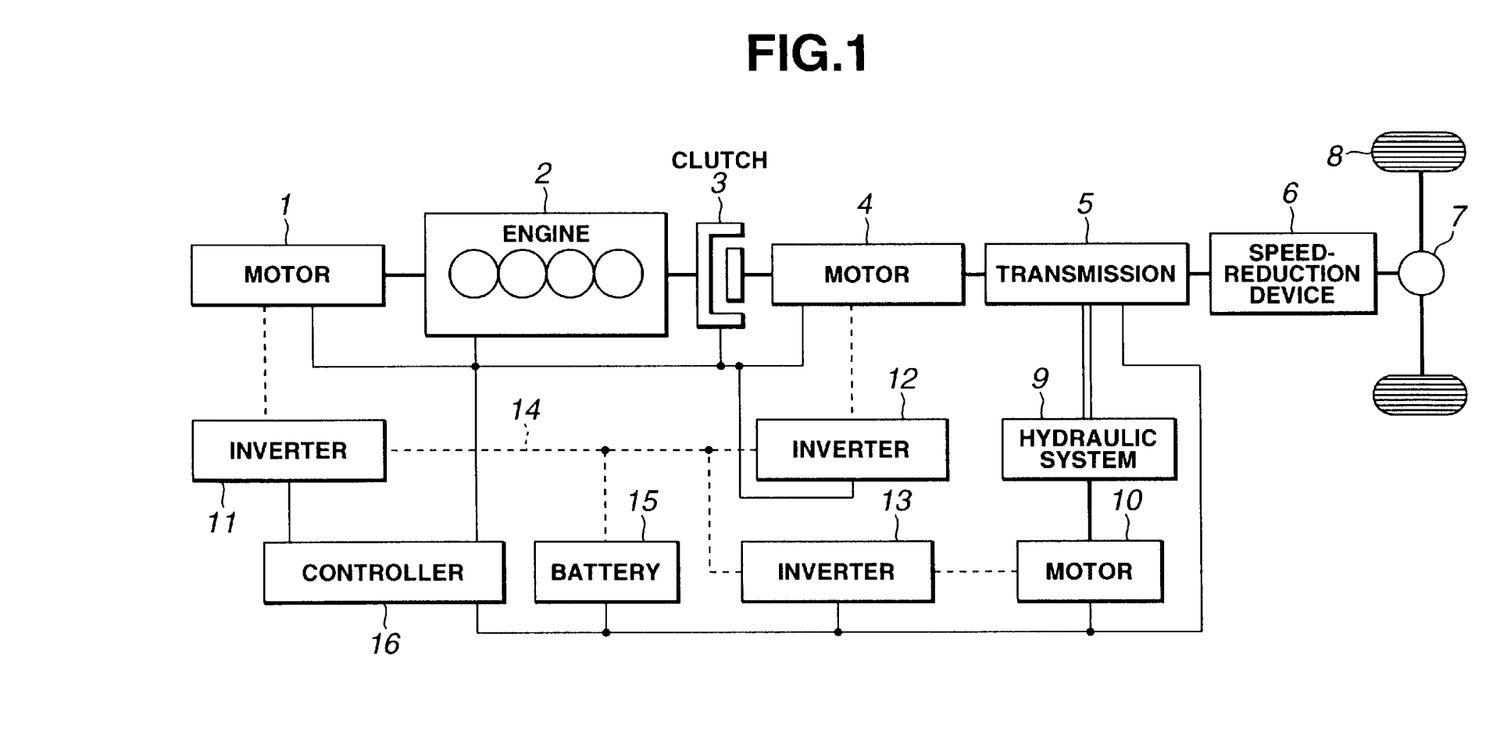
FIG. 1 is a schematic illustration of an embodiment of a drive system for a hybrid drive vehicle, in accordance with the present invention.

Referring now to FIG. 1, an embodiment of a hybrid drive vehicle (automotive vehicle) is illustrated by the reference character V. In FIG. 1, a thick full-line represents a transmission line for mechanical force, a thick dotted-line represents a line for electric power, a thin full-line represents a line for control, and double lines represent a hydraulic line. The hybrid drive vehicle V comprises a power train P which includes an electric motor 1. An internal combustion engine 2 is connected to the motor 1. The engine 2 is connected through a clutch 3 to a motor 4 which is in turn connected through a continuously variable transmission 5 to a speed-reduction device 6. The speed-reduction device 6 is connected through a differential 7 to road (drive) wheels 8. Specifically, the motor 1 has a power output shaft (not shown) which is connected to a power output shaft (not shown) of the engine 2. The power output shaft of the engine is connected to a power input shaft (not shown) of the clutch 3 whose power output shaft (not shown) is connected to a power output shaft (not shown) of the motor 4. The power output shaft of the motor 4 is connected to a power input shaft (not shown) of the continuously variable transmission 5.

With the above-arranged vehicle V, when the clutch 3 is engaged, the engine 2 and the motor 4 serve as driving sources for the vehicle V. When the clutch 3 is released, only the motor 4 serves as a driving source for the vehicle V. Driving forces of the engine 2 and/or motor 4 are transmitted to the road wheels 8 through the continuously variable transmission 5, the speed-reduction device 6 and the differential 7. The continuously variable transmission 5 is supplied with hydraulic fluid from a hydraulic system 9 so as to be hydraulically controlled in accordance with vehicle driving conditions. The hydraulic system 9 includes a hydraulic (oil) pump (not shown) driven by an electric motor 10.

Each of the motors 1, 4, 10 is an alternating current motor such as a three-phase synchronous motor or a three-phase induction motor. The motor 1 is mainly used for starting the engine 2 and for generating power. The motor 4 is mainly used for driving and braking the vehicle V. In this regard, in this embodiment, the motor 1 is referred to as a "power generating motor (motor for power generation)" while the motor 4 is referred to as a "driving motor (motor for driving the vehicle)". The motor 10 is used for driving the hydraulic pump of the hydraulic system 9. It will be understood that a direct current motor may be used as each of the motors 1, 4, 10. It will be appreciated that the motor 1 may be used for driving and braking the vehicle during engagement of the clutch 3, while the motor 4 may be used for starting the engine 2 and for power generation.

In this embodiment, the clutch 3 is a powder clutch which can control a torque transmitted to the road wheels 8. The clutch 3 may be a dry multiple disk clutch or a wet multiple disk clutch. The continuously variable transmission 5 is a belt-type continuously variable transmission for controlling power transmission through a belt, or a toroidal continuously variable transmission, in which the speed ratio (transmission ratio) of driving to driven elements is infinitely variable. The continuously variable transmission may be replaced with an non-continuously variable transmission.

The motors 1, 4, 10 are respectively driven through inverters 11, 12, 13. In case of using direct current motors respectively as the motors 1, 4, 10, DC/DC converters are respectively used in place of the inverters 11, 12, 13. The inverters 11, 12, 13 are connected to a main battery 15 through a common DC link circuit 14, so that charged DC power in the main battery 15 is converted into AC power and supplied to the motors 1, 4, 10 while generated AC power from the motors 1, 4 is converted into DC power and charged in the main battery 15. The inverters 11, 12, 13 are connected to each other through the DC link circuit 14, and therefore power generated by the motor under a regenerative operation can be directly supplied to the motor under a drive operation without passing through the main battery 15. Each of a variety of batteries such as a lithium-ion battery, a nickel-hydrogen battery and a lead-acid battery, or an electric double-layer capacitor (or power capacitor) may be used as the main battery 15.

A controller 16 is provided to control the engine speed and output torque of the engine 2, the transmitted torque of the clutch 3, the revolution speed and output torque of the motors 1, 4, 10, the transmission ratio of the continuously variable transmission 5, and the like in accordance with the vehicle driving conditions. The controller 16 includes a microcomputer, peripheral parts of the microcomputer, and a variety of actuators, though not shown.

Figure 2:
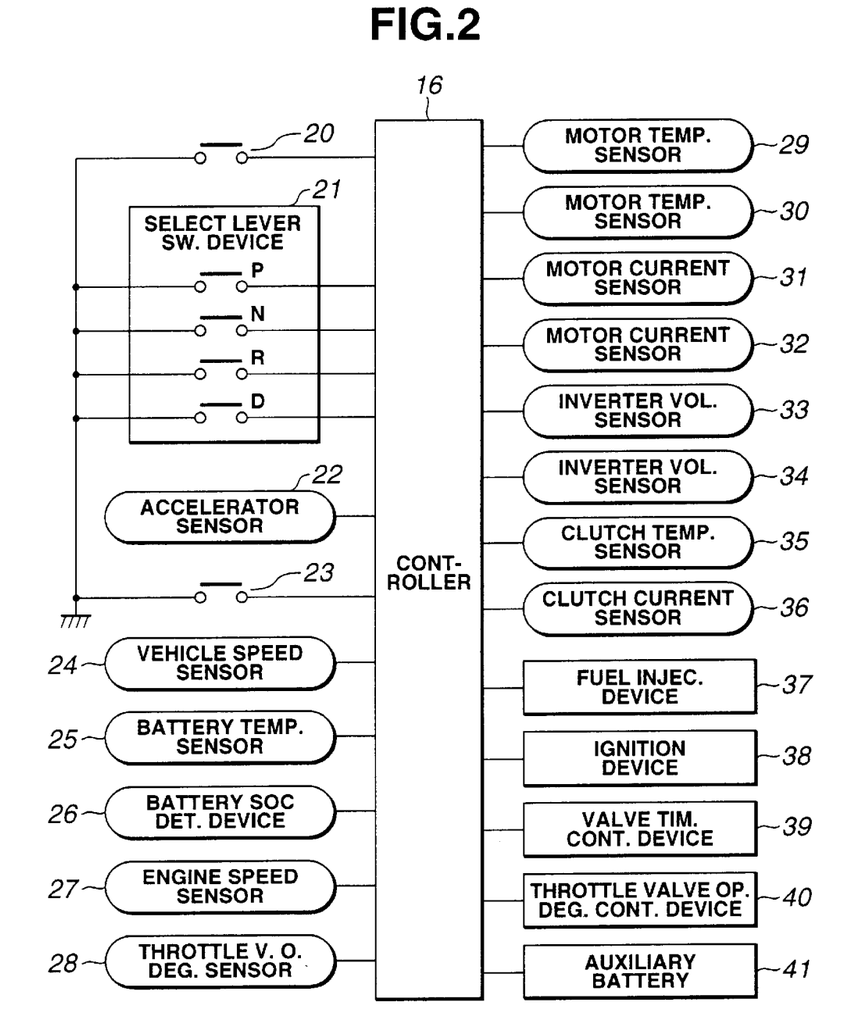
FIG. 2 is a diagram of an electrical control system of the drive system of FIG. 1.

As shown in FIG. 2, the controller 16 is electrically connected to a key switch 20, a select lever switching device 21, an accelerator sensor 22, a brake switch 23, a vehicle speed sensor 24, a battery temperature sensor 25, a battery SOC detecting device 26, an engine speed sensor 27, and a throttle opening degree sensor 28. The key switch 20 is adapted to close an electric circuit when a key (not shown) of the vehicle is set at an ON position or START position for starting the engine. Hereinafter, an operation of the switches to close the electric circuit is referred to as being switched or turned ON, while another operation of the switches to open the electric circuit is referred to as being switched or turned OFF. The select lever switching device 21 for the transmission 5 is operated by a selector lever (not shown), in which one of driving modes of Parking, Neutral, Reverse and Drive is selected by selectively switching ON one of switches P, N, R and D which respectively correspond to the driving modes of Parking, Neutral, Reverse and Drive.

The accelerator sensor 22 is adapted to detect a depressed amount (accelerator operation amount) θ of an accelerator pedal (not shown). The brake switch 23 is adapted to detect a state where a brake pedal (not shown) is depressed in which the brake switch 23 is switched ON. The vehicle speed sensor 24 is adapted to detect a vehicle speed Vs of the vehicle V. The battery temperature sensor 25 is adapted to detect a temperature Tb of the main battery 15. In this regard, the controller 16 is arranged to make such a judgment that the main battery 15 is under an appropriate temperature condition when the detected temperature Tb is $Tb1 \leq Tb \leq Tb2$ (where Tb1 is a predetermined value such as $-20°$ C., and Tb2 is another predetermined value such as $50°$ C.), and is under an inappropriate temperature condition when the detected temperature Tb is Tb<Tb1 or Tb>Tb2. Charging and discharging of the main battery 15 is not made under the inappropriate temperature condition. The battery SOC detecting device 26 is adapted to detect a charging state (referred hereafter to as "State of Charge (SOC)") of the main battery 15. In this regard, the controller 16 is arranged to judge such that the charging state is appropriate when the detected SOC is $SOC1 \leq SOC \leq SOC2$ (where SOC1 is a predetermined value such as 30%, and SOC2 is another predetermined value such as 70%) is in an insufficient state when SOC<SOC2, and is in an excessively high state when the detected SOC is SOC<SOC1. Discharging of the main battery 15 is not made in case that the charging state is in the insufficient state, while charging of the main battery 15 is not made in case that the charging state is in the excessively high state. Furthermore, the engine speed sensor 28 is adapted to detect an engine speed Ne of the engine 2. The throttle valve opening degree sensor 28 is adapted to detect an opening degree θth of a throttle valve (not shown) in the engine 2.

Further, the controller 16 is electrically connected to motor temperature sensors 29, 30, motor current sensors 31, 32, inverter voltage sensors 33, 34, a clutch temperature sensor 35, and a clutch current sensor 36. The motor temperature sensor 29 is adapted to detect a temperature Tm1 of the power generating motor 1, while the motor temperature sensor 30 is adapted to detect a temperature Tm4 of the driving motor 4. In this regard, the controller 16 is arranged to detect overheat of the motors 1, 4 respectively in accordance with the detected temperatures Tm1, Tm4. The motor current sensor 31 is adapted to detect a current Im1 of the power generating motor 1, while the motor current sensor 32 is adapted to detect a current Im4 of the driving motor 4. In this regard, the controller 16 is arranged to detect overcurrents of the motors 1, 4 respectively in accordance with the detected currents Im1, Im4.

The inverter voltage sensor 33 is adapted to detect a voltage Vi11 developed between the collector and the emitter of IGBT of the power generating inverter 11, while the inverter voltage sensor 34 is adapted to detect a voltage Vi12 developed between the collector and the emitter of IGBT of the driving inverter 12. In this regard, the controller 16 is arranged to detect troubles of IGBTs of the inverters 11, 12 respectively in accordance with the detected voltages Vi11 and Vi12. In this connection, the voltage developed between the collector and the emitter is about 2 V under a normal operation of IGBT, while the voltage exceeds 10 V when trouble occurs in IGBT. Additionally, the voltage developed between the collector and the emitter will become 0 V when short circuit occurs between the collector and the emitter, while the voltage will become generally the source voltage of the main battery 15 in case that an open state is established between the collector and the emitter.

The clutch temperature sensor 35 is adapted to detect a temperature Tc of the clutch 3, in which the controller 16 is arranged to detect overheat of the clutch 3 in accordance with the detected temperature Tc. The clutch current sensor 36 is adapted to detect a current Ic for exciting or energizing the clutch 3, in which the controller 16 is arranged to detect disconnection in the clutch 3.

The controller 16 is further electrically connected to a fuel injection device 37, an ignition device 38, a valve timing control device 39, a throttle valve opening degree control device 40, an auxiliary battery 41 and the like of the engine 2. In this regard, the controller 16 is arranged to control the fuel injection device 37 in such a manner as to make and stop fuel supply to the engine and to regulate the amount of fuel to be supplied to the engine. Additionally, the controller 16 is arranged to control the ignition device 38 in such a manner as to timely make ignition for air-fuel mixture formed in the engine. Further, the controller 16 is arranged to control the valve timing control device 39 in such a manner as to regulate closing timing of intake valve of the engine 2, and to control the throttle valve opening degree control device 40 in such a manner as to regulate the throttle valve opening degree θth of the engine 2. This throttle valve opening degree control device 40 is not mechanically connected to the accelerator pedal, and therefore is adapted to control the throttle valve opening degree θth regardless of the depression amount θ of the accelerator pedal. The auxiliary battery 41 is arranged to supply a low voltage power to the controller 16.

Figure 3:
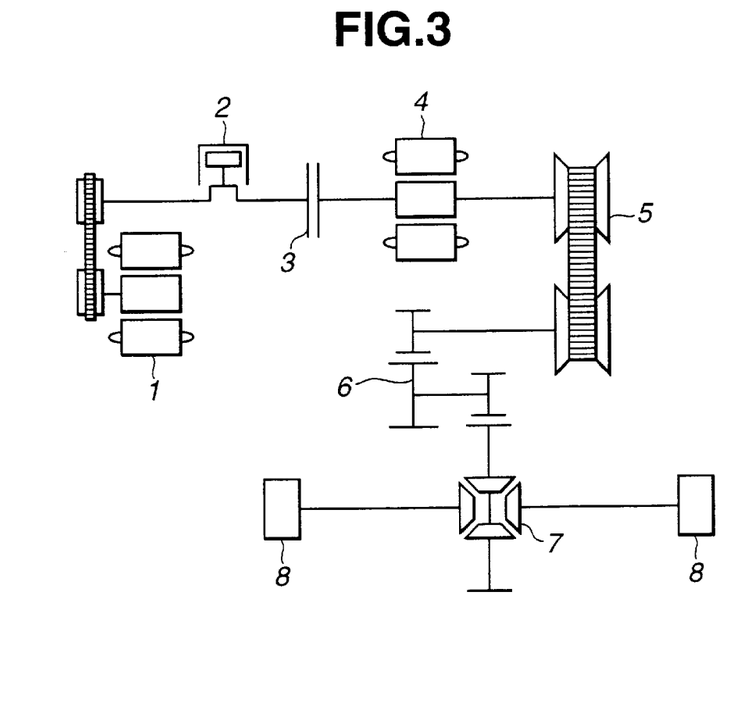
FIG. 3 is a schematic illustration of an example of a power train forming part of the drive system according to the present invention.
Figure 4:
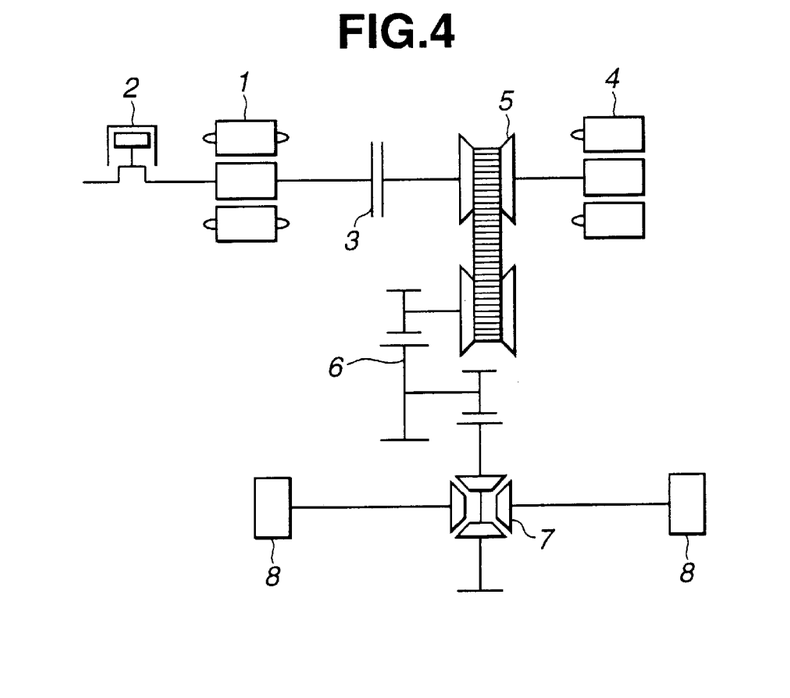
FIG. 4 is a schematic illustration of another example of the power train forming part of the drive system according to the present invention.

FIGS. 3 and 4 illustrate examples of arrangement of a power train P using a belt-type continuously variable transmission, for the hybrid drive vehicle V. The belt-type continuously variable transmission 5 includes a belt 5a through which drive power is transmitted from a primary pulley 5b to a secondary pulley 5c.

In the example of FIG. 3 which corresponds to the power train P in the embodiment of FIG. 1, the motor 1 is disposed on an upstream side of the engine 2 with respect to flow of drive power for the road wheels 8, in which the power output shaft of the engine 2 is directly connected to the power input shaft of the clutch 3 so that both the shafts constitute a single axis shaft, while the power output shaft of the engine 2 is connected to the power output shaft of the motor 1 through a belt and toothed wheels. Additionally, the motor 4 on a power output side of the clutch 3 is disposed on an upstream side of the continuously variable transmission 5 with respect to flow of the drive power for the drive road wheel 8, in which the power output shaft of the clutch 3 is passed through the rotor of the motor 4 so as to be directly connected to the power input shaft of the continuously variable transmission 5 thereby constituting a single axis power output shaft of the clutch 3.

In the example of FIG. 4, the motor 1 is disposed on a downstream side of the engine 2 with respect to flow of the drive power for the road wheels 8, in which the power output shaft of the engine 2 is passed through a rotor of the motor 1 and directly connected to the power input shaft of the clutch 3 so that the power output shaft of the engine and the power input shaft of the clutch 3 constitute a single axis shaft. Additionally, the motor 4 is disposed on a downstream side of the continuously variable transmission 5 with respect to flow of the drive power for the drive road wheels 8, in which the power output shaft of the clutch 3 serves as the power input shaft of the continuously variable transmission 5 so as to be directly connected to the power output shaft of the motor 4 thereby constituting a single axis power output shaft of the clutch 3.

It will be understood that, in the above both examples, the motor 4 is connected to the power input shaft of the continuously variable transmission 5.

While only two types of arrangement of the power train have been shown and described as the examples, it will be understood that the devices constituting the power train P may take a variety of arrangements other than those of the examples as far as being configured such that the motor 4 and the power input shaft of the continuously variable transmission 5 are connected to the power output shaft of the clutch 3 so that the drive power is transmitted from the power output shaft of the continuously variable transmission 5 through the speed-reduction device 6 and the differential 7 to the road wheels 8.

Figure 5:
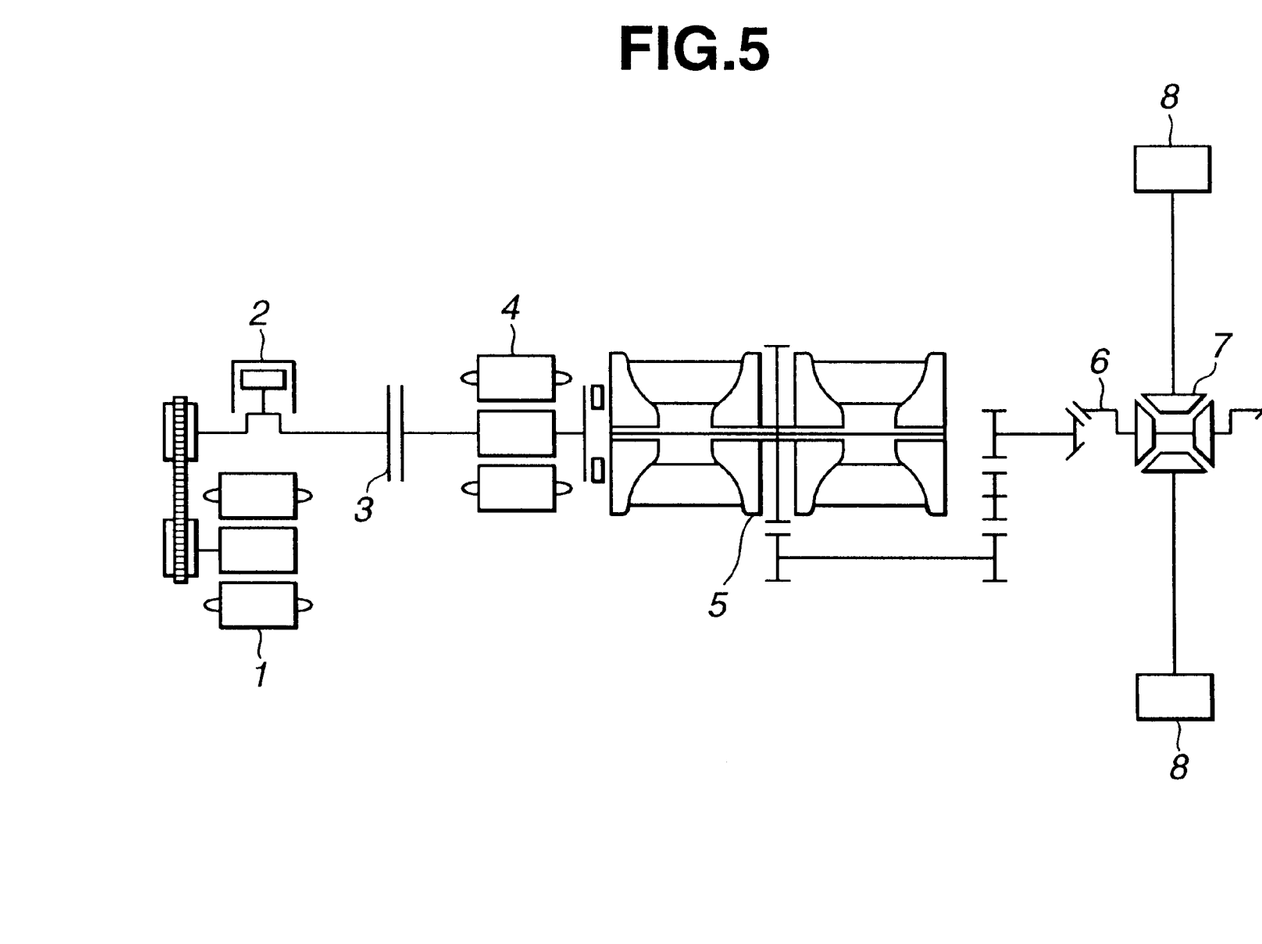
FIG. 5 is a schematic illustration of a further example of the power train forming part of the drive system according to the present invention.

FIG. 5 illustrates an example of the arrangement of the power train P using a toroidal continuously variable transmission, for the hybrid drive vehicle V.

The arrangement of FIG. 5 is similar to that of FIG. 3 with the exception that a toroidal continuously variable transmission 5' is used in place of the belt-type continuously variable transmission 5. While the motor 4 has been shown as being disposed on the side of the clutch 3 so as to be interposed between the clutch 3 and the toroidal continuously variable transmission 5', it will be understood that the toroidal continuously variable transmission 5' may be disposed on the side of the clutch 3. In any cases, the motor 4 is connected to the power input shaft of the toroidal continuously variable transmission 5'.

Next, manner of operation of the embodiment of the hybrid drive vehicle V (shown in FIG. 1) will be discussed hereinafter.

When the devices constituting the power train P are normally operating, the clutch 3 is released basically in a low speed and low load engine operating condition so that the vehicle V runs under driving of the driving motor 4 while the clutch 3 is engaged basically in a high speed and high load engine operating condition so that the vehicle V runs under driving of the engine 2. However, when the vehicle V is rapidly started, the engine 2 is started under driving of the power generating motor 1, and then the clutch 3 is put into a partly engaged state, so that the vehicle V is started and accelerated under driving of both the engine 2 and the driving motor 4. When the vehicle speed of the vehicle V has reached a high level, running mode of the vehicle V is changed into one ("engine-driven vehicle running mode") under driving of the engine 1.

As discussed above, the power generating motor 1 is normally used for engine starting and for power generation, while the driving motor 4 is normally used for driving the vehicle and applying regenerative braking. Power generated by the power generating motor 1 is utilized to be charged to the main battery 15, to drive the motor 10 for driving the hydraulic pump, or to drive the driving motor 4 which is operating to drive. Similarly, power generated upon regeneration operation of the driving motor 4 is utilized to be charged to the main battery 15 and to drive the pump 10 for the hydraulic pump.

Further, it will be appreciated that the hybrid drive vehicle V of this embodiment makes its forward running under normal rotation of the driving motor 4, and its backward running under reverse rotation of the driving motor 4 upon releasing the clutch 3.

In the hybrid drive vehicle V of this embodiment shown in FIG. 1, backup operations can be executed by using the normally operating devices constituting the power train P so as to secure a required minimum running function of the vehicle in case that trouble has arisen in the devices constituting the power train. Such backup operations will be discussed hereinafter with reference to FIGS. 6 to 12.

Figure 6:
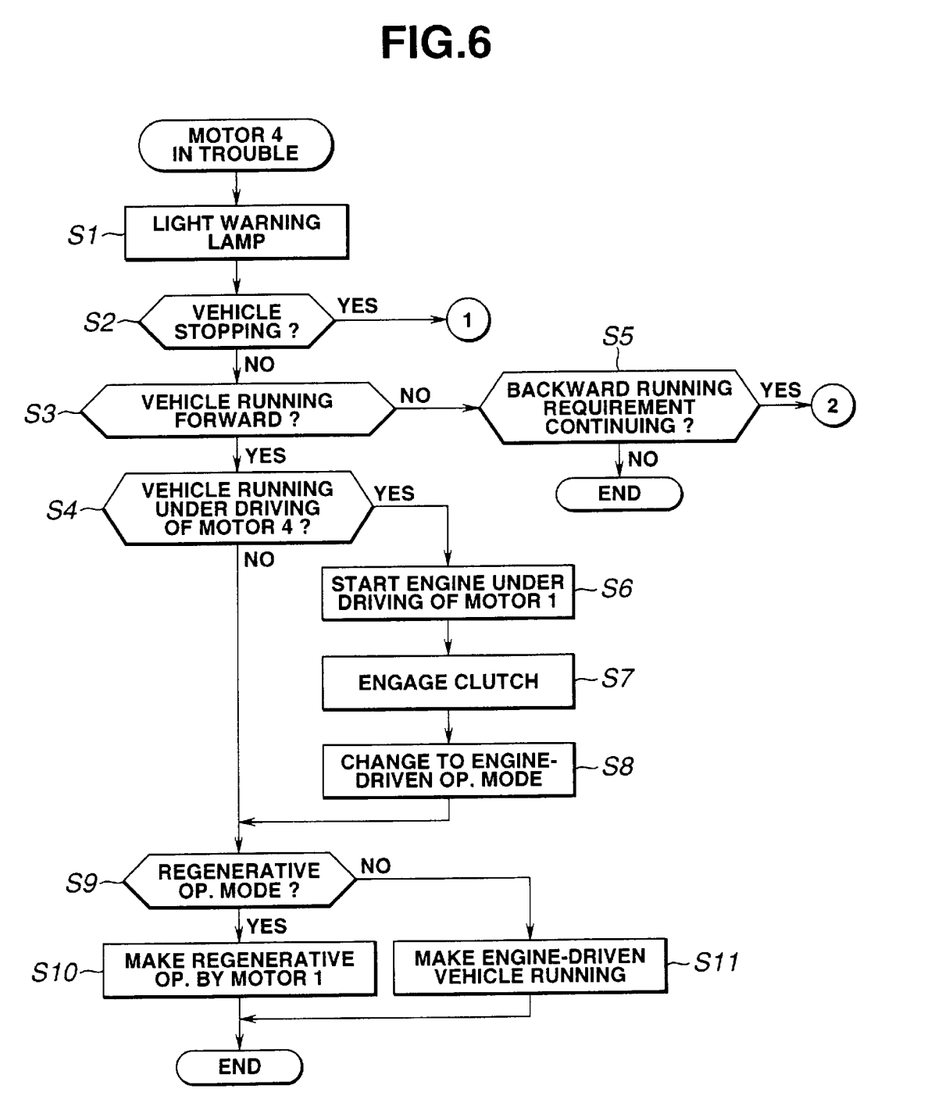
FIG. 6 is a part of a flowchart of control program used in case that trouble arises in a driving motor forming part of the drive system of FIG. 1.
Figure 7:
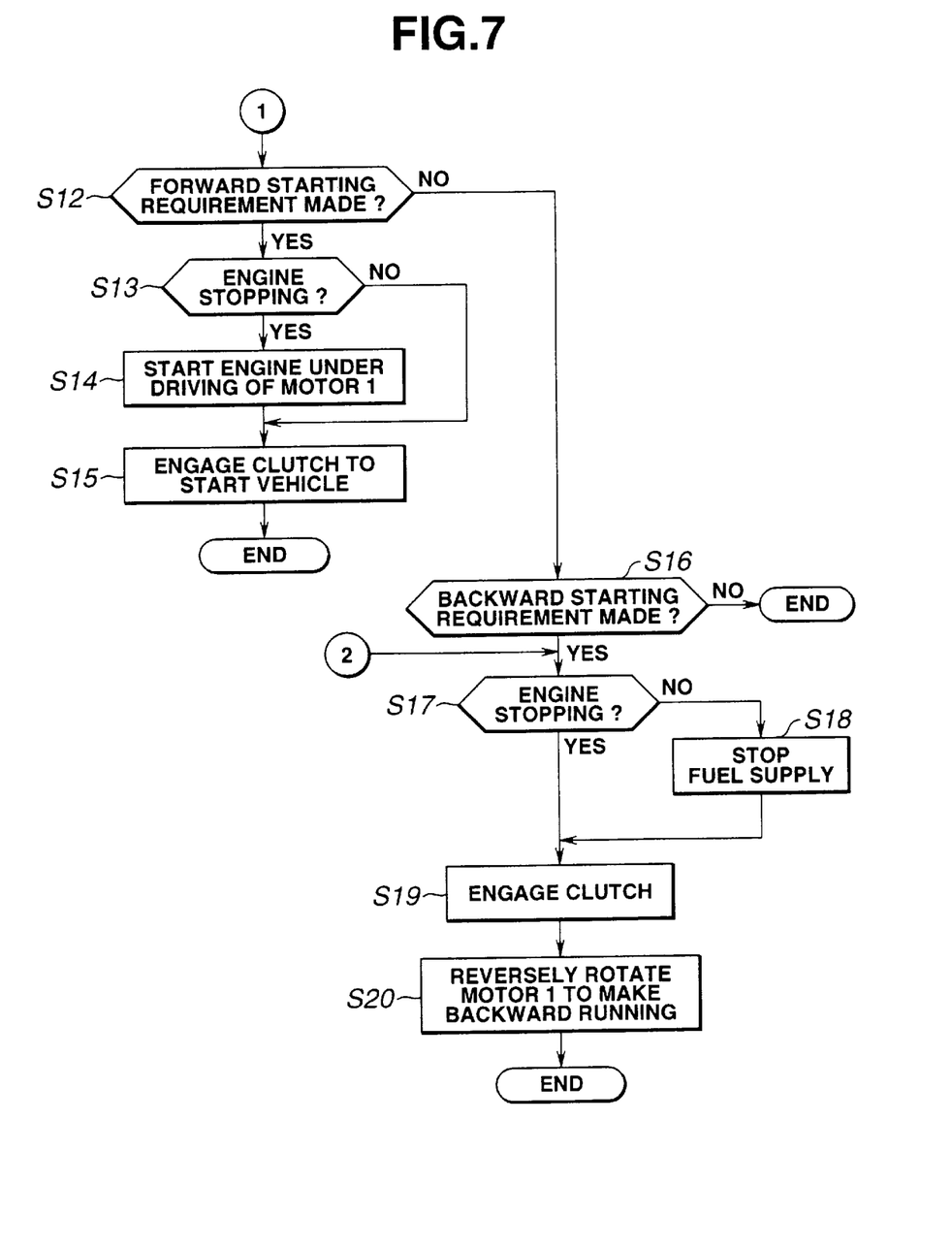
FIG. 7 is another part of the flowchart a part of which is shown in FIG. 6.

FIGS. 6 and 7 show a flowchart of control program for the backup operation in case that trouble has arisen in the driving motor 4.

The controller 16 is arranged to execute this control program when it detects overheat of the driving motor 4 or overcurrent of the driving motor 4, or when it detects trouble in IGBT of the driving inverter 12. Specifically, when the controller 16 detects the above trouble in the motor 4 or the inverter 12, a warning lamp (not shown) for indicating the trouble in the driving motor 4 is lighted at a step S1. At a step S2, judgement is made as to whether the vehicle is at a stop or not. Flow goes to a step S12 when the vehicle is at a stop, whereas the flow goes to a step S3 when the vehicle is running.

At a step S3, judgement is made as to whether the vehicle is running forward or not. When the vehicle is running forward, the flow goes to a step S4 at which judgement is made as to whether the vehicle is running under driving of the driving motor 4 or not. When the vehicle is running under driving of the driving motor 4, the flow goes to a step S6. When the trouble has been detected during the vehicle forward running under driving of the driving motor 4, the engine 2 is driven by the power generating motor 1 thereby to start engine operation under firing or fuel combustion, at the step S6. At a subsequent step S7, the clutch 3 is slowly engaged thereby starting and accelerating the vehicle. At a step S8, driving the vehicle is changed to an engine-driven operation mode in which the vehicle runs under driving of the engine 2. It is to be noted that a judgment result is such the vehicle is running under driving of the engine when the vehicle is judged not to be running under driving of the motor 4 at the step S4. At a step 9, judgment is made as to whether the vehicle is in a regenerative operation mode or not. When the vehicle is in the regenerative operation mode, the flow goes to a step S10 in which the regenerative operation is made by using the power generating motor 1. When the vehicle is not in the regenerative operation mode, an engine-driven operation is continued in which the vehicle is driven under driving of the engine 2, at a step S11.

When a judgement result is such that the vehicle is running backward, the flow goes to a step S5 in which judgement is made as to whether a requirement for a backward running has been continuously made. When the requirement for the backward running has been continuously made, the flow goes to a step S17 in which judgment is made as to whether the engine has been stopped. When the engine is being operated under firing, the flow goes to a step 18 in which fuel supply to the engine 2 is stopped. At a step S19, the clutch 3 is engaged. At a subsequent step S20, the power generating motor 1 is reversely rotated so that the vehicle runs backward, in which the engine (specifically, a crankshaft) 2 is also reversely rotated.

When a judgement result is such that the vehicle is at a stop, at the step S2, judgement is made as to whether a requirement for forward (vehicle) starting has been made or not, at the step S12. When the requirement for the forward starting has been made, the flow goes to a step S13 in which judgement is made as to whether the engine is stopped or not. When the engine 2 is stopped, the flow goes to a step S14 in which the engine 2 is operated under driving of the power generating motor 1 so as to start the engine operation under firing. At a subsequent step S15, the clutch 3 is engaged so that the vehicle is started under driving of the engine 2.

When the requirement for the forward (vehicle) starting has not been made, the flow goes to a step S16 in which judgement is made as to whether a requirement for backward (vehicle) starting has been made. When the requirement for the backward starting has been made, the flow goes to a step S17 in which judgement is made as to whether the engine is stopped. When the engine is being operated under firing, the flow goes to a step S18 in which fuel supply to the engine is stopped. At a step S19, the clutch 3 is engaged. At a subsequent step S20, the power generating motor 1 is reversely rotated in which the engine (specifically, the crankshaft) 2 is reversely rotated, so that the vehicle runs backward.

Thus, in case that trouble has been detected in the driving motor 4 or the driving inverter 12, the engine 2 is stared by the power generating motor 1, and then the clutch 3 is slowly engaged to cause the vehicle to start and accelerate, so that the vehicle operation is changed into an engine-driven operation (vehicle running) mode. As a result, the vehicle can run forward even if the driving motor 4 or the driving inverter is in trouble. Besides, in case that trouble in the driving motor 4 and the driving inverter 12 has been detected, the operation of the engine 2 under firing is stopped while engaging the clutch 3, and then motor 1 is reversely rotated to make backward running of the vehicle. As a result, the vehicle can run backward even if the driving motor 4 or the driving inverter 12 is in trouble. Furthermore, in case that trouble is detected in the driving motor 4 or the driving inverter 12, the regenerative operation of the vehicle is accomplished under operation of the power generating motor 1, so that regenerative braking and regenerative power generation can be achieved.

Figure 8:
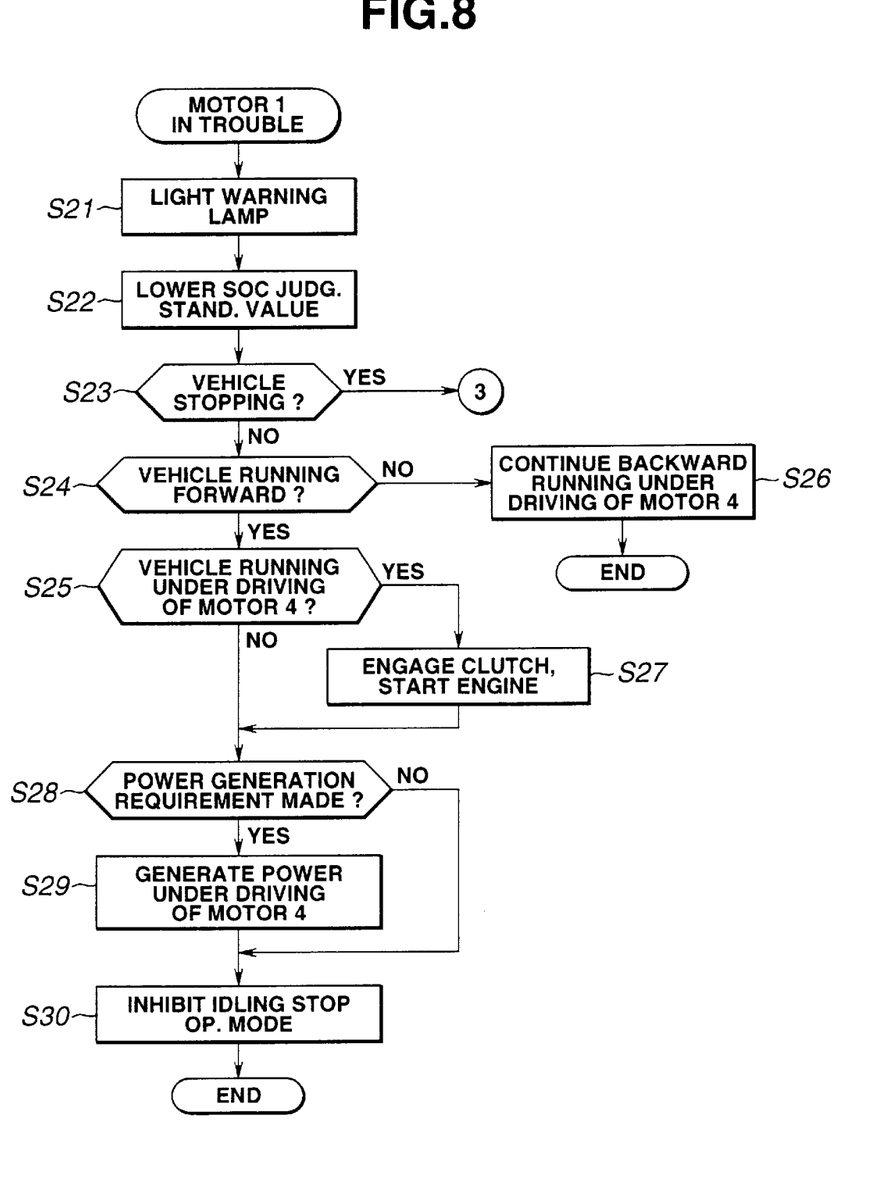
FIG. 8 is a part of a flowchart of control program used in case that trouble arises in a power generating motor forming part of the drive system of FIG. 1.
Figure 9:
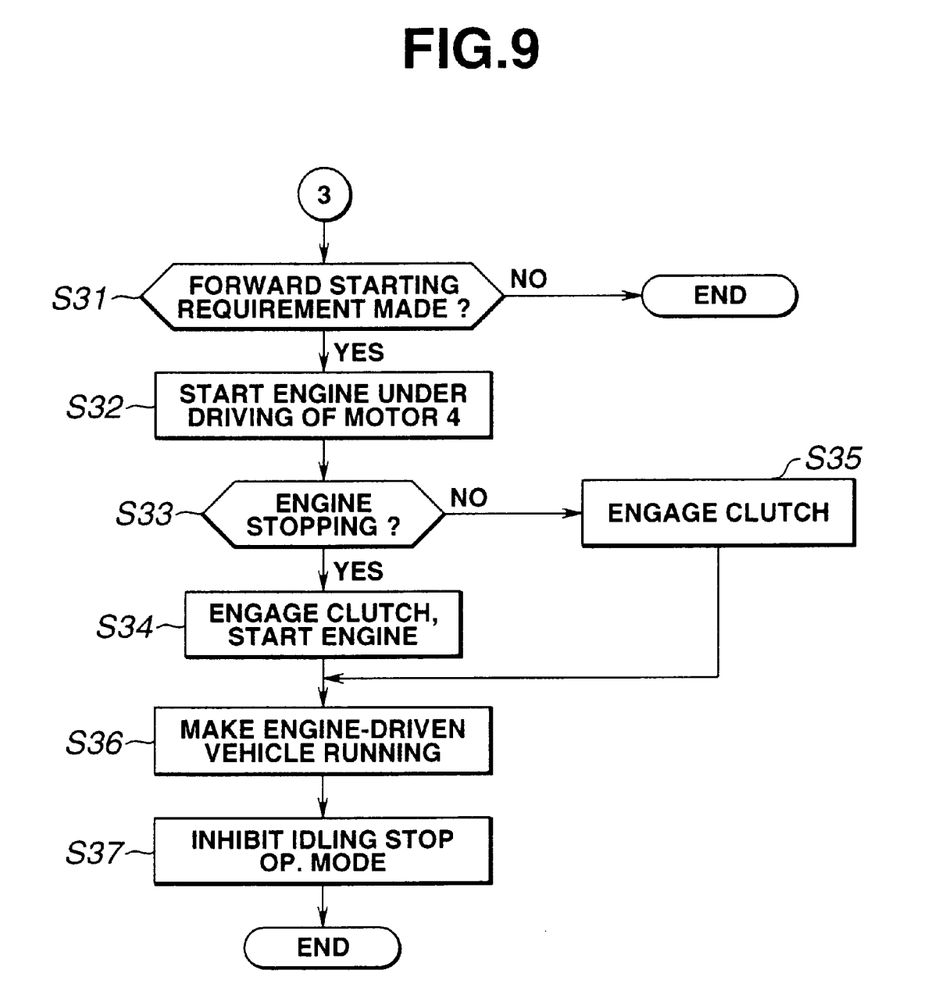
FIG. 9 is another part of the flowchart a part of which is shown in FIG. 8.

FIGS. 8 and 9 show a flowchart of control program for the backup operation in case that trouble has arisen in the generating motor 1.

The controller 16 is arranged to execute this control program when it detects overheat or overcurrent of the power generating motor 1, or when it detects trouble in IGBT of the power generating inverter 11. Specifically, when the controller 16 detects the above trouble in the motor 1 or the inverter 11, a warning lamp (not shown) for indicating the trouble in the power generating motor 1 is lighted at a step S21. At a step S22, a standard value for judging SOC of the main battery 15 is lowered. This judgment standard value is for judging as to whether that discharging of the main battery is possible or not, so that charging of the main battery 15 is normally accomplished by making a power generating operation of the power generating motor 1 when SOC lowers below the standard value. In case that the power generating motor 1 is in trouble, the judgment standard value is lowered to the permissible lowest level of the main battery 15 as an emergency measure, thereby supplying power as much as possible to the driving motor 4.

At a step S23, judgment is made as to whether the vehicle is at a stop or not. When the vehicle is at a stop, flow goes to a step S31. When the vehicle is during running, the flow goes to a step S24 in which judgement is made as to whether the vehicle is running forward. When the vehicle is running forward, the flow goes to a step S25 in which judgment is made as to whether the vehicle is running under driving of the driving motor 4 or not. When the trouble is detected during the forward running of the vehicle under driving of the driving motor 4, the flow goes to a step S27 in which the clutch 3 is engaged to drive the engine 2 under driving of the driving motor 4 thereby to start engine operation under firing. When the vehicle is not making its forward running under driving of the driving motor 4, the vehicle is running forward under driving of the engine 2, in which engine operation under firing has been already made.

At a step S28, judgment is made as to whether a requirement for power generation is raised or not, in which the requirement is made when SOC of the main battery 15 is lowered below the standard value so that charging of the main battery 15 becomes necessary, or when power is required in devices such as the motor 10 for the hydraulic pump thus raising requirement for power generation. When the requirement is raised, the flow goes to a step S29 in which power is generated by the driving motor 4. Subsequently, since the power generating motor 1 is in trouble, an idling stop operation mode (in which idling is stopped every vehicle stop) is inhibited at a step S30.

When a judgment result i such that the vehicle is running backward, at a step S24, the flow goes to a step S26 in which the backward running under driving of the driving motor 4 is continued.

When a judgment result is such that the vehicle is in a stop at the step S23, the flow goes to a step S31 in which judgement is made as to whether a requirement for forward (vehicle) starting has been made or not. When the requirement for the forward starting has been made, the flow goes to a step S32 in which starting of the vehicle is accomplished under driving of the driving motor 4. At a subsequent step S33, judgment is made as to whether the engine 2 is stopped or not. When the engine 2 is stopped, the flow goes to a step S34 in which the clutch 3 is engaged to drive the engine under driving of the driving motor 4 thereby starting engine operation under firing. When the engine 2 is being operated under firing upon the judgment at the step S33, the flow goes to a step S35 in which the clutch 3 is engaged. At a step S36, a motor-driven operation (vehicle running) mode of the vehicle is changed into the engine-driven operation mode. At a step S37, the idling stop operation mode is inhibited.

Thus, in case that trouble in the power generating motor 1 or in the power generating inverter 11 has been detected, the engine 2 is driven by the driving motor 4 so as to start engine operation under firing while inhibiting the idling stop operation mode of the engine 2, thus accomplishing engine operation. As a result, even if the power generating motor 1 or the power generating inverter 11 is in trouble, the engine 2 can be started thereby making it possible to cause the vehicle to run.

Additionally, in case that trouble in the power generating motor 1 or in the power generating inverter 11 has been detected, power generation can be accomplished by the driving motor 4, so that power generated by the driving motor 4 can be supplied to the motor 10 for the hydraulic pump. As a result, travel distance of the vehicle can be prolonged in case of trouble made in the power generating motor 1 or in the power generating inverter 11.

Furthermore, in case that trouble in the power generating motor 1 or in the power generating inverter 11 has been detected, the SOC judgment standard value of the main battery 15 is lowered. As a result, even when the power generating motor 1 or the power generating inverter 11 is in trouble, more power can be supplied to the motor 10 for the hydraulic pump and to the driving motor 4.

Figure 10:
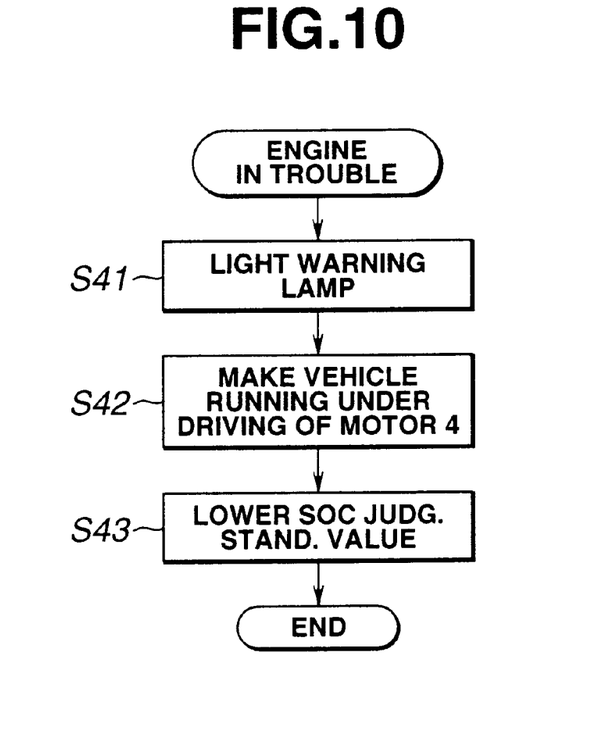
FIG. 10 is a flowchart of control program used in case that trouble arises in an engine forming part of the drive system of FIG. 1.

FIG. 10 shows a flowchart of control program for the backup operation in case that trouble has arisen in the engine 2.

The controller 16 is arranged to execute this control program in case that trouble arises in the engine 2. Specifically, if the engine speed of the engine 2 does not exceed a predetermined level (such as 500 r.p.m.) even though a normal engine starting operation is made, the controller 16 judges such that engine starting is impossible, and therefore lights a warning lamp (not shown) for indicating the trouble in the engine 2 at a step S41. At a step S42, vehicle running under driving of the driving motor 4 is initiated. Subsequently, at a step S43, the SOC judgment standard value is lowered to the permissible lowest level of the main battery 15 as an emergency measure, thereby supplying power as much as possible to the driving motor 4 thus prolonging the travel distance of the vehicle.

Thus, in case that trouble arises in the engine 2, the SOC judgment standard value of the main battery 15 is lowered so that vehicle running can be made under driving of the driving motor 4. Accordingly, more power can be supplied to the motor 10 for the hydraulic pump, and to the driving motor 4. As a result, the travel distance of the vehicle can be prolonged.

Figure 11:
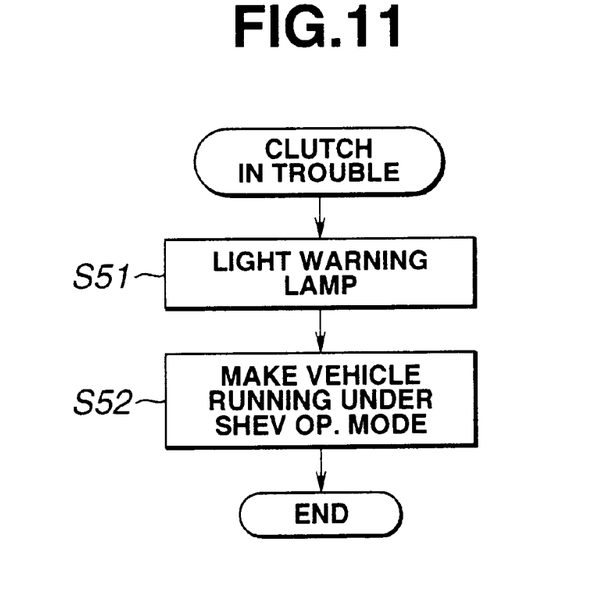
FIG. 11 is a flowchart of control program used in case that trouble arises in a clutch forming part of the drive system of FIG. 1.

FIG. 11 shows a flowchart of control program for the backup operation in case that trouble has arisen in the clutch 3.

The controller 16 is arranged to execute this control program in case that trouble arises in the clutch 3. Specifically, If the controller 16 detects overheat or disconnection of the clutch 3, a warning lamp (not shown) for indicating trouble in the clutch 3 is lighted at a step S51. At a subsequent step S52, vehicle operation is changed into a series hybrid electric vehicle (SHEV) operation mode since the clutch 3 cannot be engaged, in which the power generating motor 1 is driven under driving of the engine 2. Accordingly, power generated by the power generating motor 1 is supplied to the driving motor 4 thereby causing the vehicle to run.

Thus, in case that trouble arises in the clutch 3, the power generating motor 1 is driven by the engine 2 thereby to generate power, and then the generated power is supplied to the driving motor 4 so as to cause the vehicle to run under driving of the driving motor 4. As a result, the vehicle can run forward or backward even if trouble arises in the clutch 3.

Figure 12:
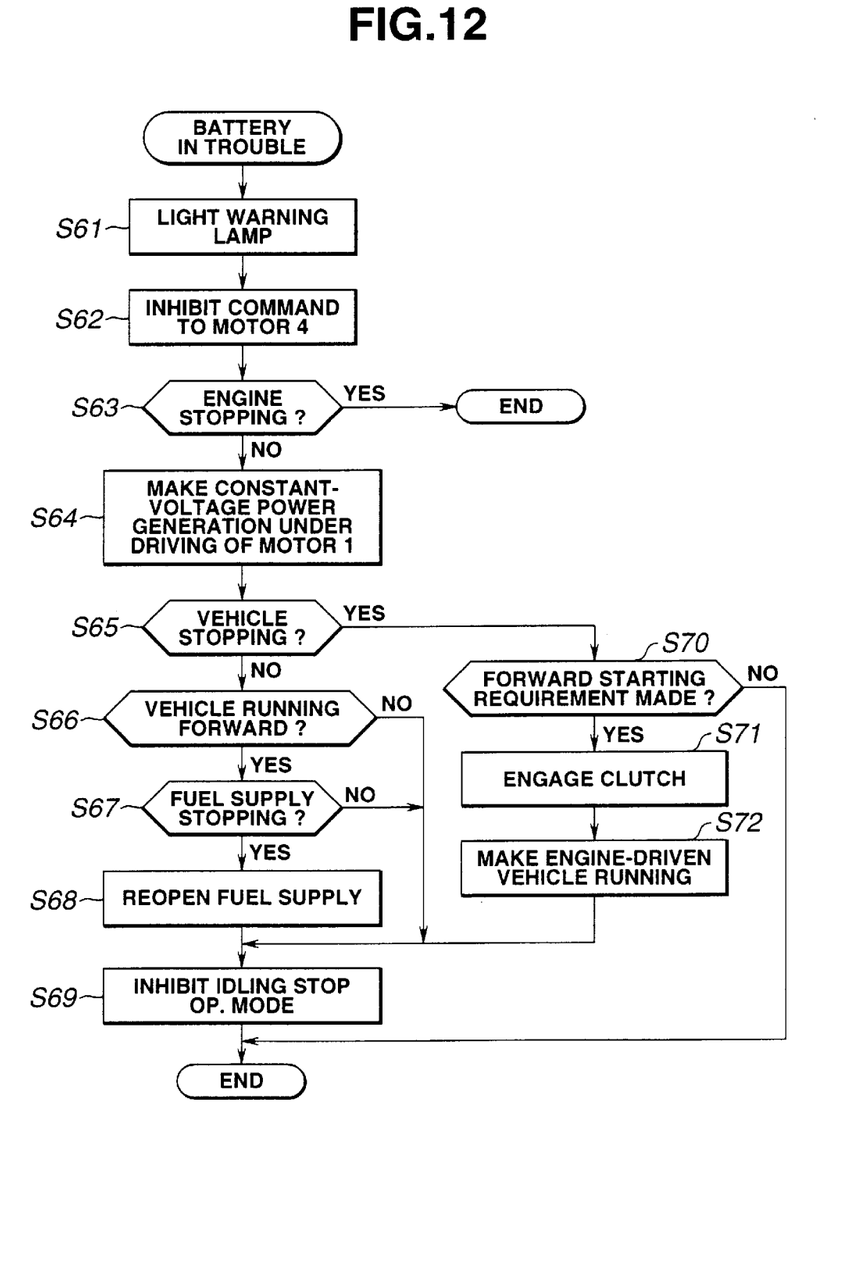
FIG. 12 is a flowchart of control program used in case that trouble arises in a main battery forming part of the drive system of FIG. 1.

FIG. 12 shows a flowchart of control program for the backup operation in case that trouble has arisen in the main battery 15.

The controller 16 is arranged to execute this control program in case that trouble arises in the clutch 3. Specifically, If the controller 16 has detected an inappropriate temperature condition or an excessively low state of SOC in the main battery 15, a warning lamp (not shown) for indicating trouble in the main battery 15 is lighted at a step S61. At a step S62, command to the motor 4 is inhibited. At a subsequent step S63, judgment is made as to whether the engine 2 has been stopped or not. When the engine 2 is being operated under firing, constant-voltage power generation is made by the power generating motor 1 at a step S64, so that generated power is supplied to the motor 10 for the hydraulic pump.

At a step S65, judgment is made as to whether the vehicle is in a stop or not. When the vehicle is in a stop, a flow goes to a step S70. When the vehicle is running, judgment is made as to whether the vehicle runs forward or not at a step S66. When the vehicle is running forward, judgment is made as to whether fuel supply to the engine has been stopped or not at a step S67. When fuel supply has been stopped, the flow goes to a step S68 in which fuel supply to the engine is reopened. At a subsequent step S69, the idling stop operation mode is inhibited. When the vehicle is running backward, the idling stop operation mode is inhibited at the step S69.

When a judgment result is such that the vehicle is in a stop at the step S65, the flow goes to a step 70 in which judgment is made as to whether a request for forward (vehicle) starting has been made or not. When the request for forward starting has been made, the flow goes to a step S71 in which the clutch 3 is engaged. At a subsequent step S72, the vehicle runs under driving of the engine 2.

Thus, in case that trouble in the main battery 15 has been detected during operation of the engine 2 under firing, power generation is accomplished by the power generating motor 1, and then the generated power is supplied to the motor 10 for the hydraulic pump while engaging the clutch 3. This causes the vehicle to run under driving of the engine 2. As result, the vehicle can run forward even if trouble arises in the main battery 15.

Additionally, in case that trouble in the main battery 15 is detected during forward running of the vehicle upon fuel supply to the engine 2 having been stopped, fuel supply is reopened while inhibiting the idling stop operation mode, thereby causing the vehicle to run forward even if trouble arises in the main battery 15.

The entire contents of Japanese Patent Application No. P10-86647 (filed Mar. 31, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A drive system for a hybrid drive vehicle, comprising:
    a driving mechanism including a clutch having power input and output shafts, an engine connected to the power input of said clutch, a first motor for generating power, connected to the power input shaft of said clutch, a second motor for driving a drive wheel, having an input shaft connected to the power output shaft of said clutch, and a transmission having a power input shaft connected to the power output shaft of said clutch, and a power output shaft connected to the drive wheel;
    a third motor for driving a hydraulic pump of a hydraulic system for said transmission;
    a battery;
    a first inverter connected between said first motor and said battery, charging and discharging between said first motor and said battery being made through said first inverter;
    a second inverter connected between said second motor and said battery, charging and discharging between said second motor and said battery being made through said second inverter;
    a third inverter connected between said third motor and said battery, changing and discharging between said battery and said motor being made through said third inverter;
    a first trouble detecting device for detecting trouble in said first motor and in said first inverter;
    a controller for controlling said engine, said inverters, said transmission and said clutch, said controller being arranged to engage said clutch and to drive said second motor so as to start operation of said engine under firing, in response to the trouble detected by said first trouble detecting device.

2. A drive system as claimed in claim 1, wherein said controller is arranged to inhibit an idling stop operation mode for said engine, in response to the trouble detected by said trouble detecting device.

3. A drive system as claimed in claim 1, wherein said controller is arranged to cause power generation to be made under driving of said second motor.

4. A drive system as claimed in claim 1, wherein said controller is arranged to lower a standard value for judging a state where said battery is dischargeable, in response to the trouble detected by said first trouble detecting device.

5. A drive system as claimed in claim 1, further comprising
    a second trouble detecting device for detecting trouble in said second motor and in said second inverter,
    wherein said controller is arranged to stop the operation of said engine under firing, to engage said clutch and to reversely rotating said second motor so as to cause the vehicle to run backward, in response to the trouble detected by said second trouble detecting device.

6. A drive system as claimed in claim 1, further comprising
    an engine trouble detecting device for detecting trouble in said engine,
    wherein said controller is arranged to lower a standard value for judging as to whether said battery is in a state to be dischargeable, and to cause the vehicle to run under driving of said second motor, in response to the trouble detected by said engine trouble detecting device.

7. A drive system as claimed in claim 1, further comprising
    a clutch trouble detecting device for detecting trouble in said clutch,
    wherein said controller is arranged to drive said first motor under driving of said engine so as to generate power, and to supply the generated power to said second motor so as to cause the vehicle to run under driving of said second motor, in response to the trouble detected by said clutch trouble detecting device.

8. A drive system as claimed in claim 1, further comprising
    a battery trouble detecting device for detecting trouble in said battery,
    wherein said controller is arranged to inhibit an idling stop operation mode for said engine, and to drive said first motor under driving of said engine so as to generate power, in response to the trouble detected by said battery trouble detecting device.

9. A drive system as claimed in claim 1, wherein said transmission is a continuously variable transmission.

10. A drive system for a hybrid drive vehicle, comprising:
- a driving mechanism including a clutch having power input and output shafts, an engine connected to the power input of said clutch, a first motor for generating power, connected to the power input shaft of said clutch, a second motor for driving a drive wheel, having an input shaft connected to the power output shaft of said clutch, and a transmission having a power input shaft connected to the power output shaft of said clutch, and a power output shaft connected to the drive wheel;
- a third motor for driving a hydraulic pump of a hydraulic system for said transmission;
- a battery;
- a first inverter connected between said first motor and said battery, charging and discharging between said first motor and said battery being made through said first inverter;
- a second inverter connected between said second motor and said battery, charging and discharging between said second motor and said battery being made through said second inverter;
- a third inverter connected between said third motor and said battery, changing and discharging between said battery and said motor being made through said third inverter;
- trouble detecting means for detecting trouble in said first motor and in said first inverter; and
- means for controlling said engine, said inverters, said transmission and said clutch, said controlling means being arranged to engage said clutch and to drive said second motor so as to start operation of said engine under firing, in response to the trouble detected by said trouble detecting means.

* * * * *